US006689983B2

(12) United States Patent
Horner-Richardson et al.

(10) Patent No.: US 6,689,983 B2
(45) Date of Patent: Feb. 10, 2004

(54) TORCH HANDLE GAS CONTROL

(75) Inventors: Kevin D. Horner-Richardson, Cornish, NH (US); Shiyu Chen, Claremont, NH (US); Roger W. Hewett, Plainfield, NH (US); Joseph P. Jones, Lebanon, NH (US); Kevin J. Kinderson, Corinth, VT (US); Darrin H. MacKenzie, Windsor, VT (US); Fred Rogers, Enfield Center, NH (US)

(73) Assignee: Thermal Dynamics Corporation, West Lebanon, NH (US)

( * ) Notice: Subject to any disclaimer, the term of this patent is extended or adjusted under 35 U.S.C. 154(b) by 0 days.

(21) Appl. No.: 10/083,101

(22) Filed: Feb. 26, 2002

(65) Prior Publication Data

US 2003/0160030 A1 Aug. 28, 2003

(51) Int. Cl.[7] ................................................ B23K 10/00
(52) U.S. Cl. ............................ 219/121.39; 219/121.55; 219/121.54; 219/121.48
(58) Field of Search ........................ 219/121.39, 121.45, 219/121.48, 121.55, 121.54, 121.57, 74, 75, 137.31, 137.63

(56) References Cited

U.S. PATENT DOCUMENTS

| | | | | |
|---|---|---|---|---|
| 3,581,051 A | * | 5/1971 | Brown | 219/131 |
| 5,039,837 A | * | 8/1991 | Nourbakhsh et al. | 219/121.48 |
| 5,290,995 A | | 3/1994 | Higgins et al. | |
| 5,760,363 A | | 6/1998 | Hackett et al. | |
| 5,796,067 A | | 8/1998 | Enyedy et al. | |
| 6,326,583 B1 | * | 12/2001 | Hardwick et al. | 219/121.55 |
| 6,486,430 B2 | * | 11/2002 | Naor | 219/121.44 |

* cited by examiner

*Primary Examiner*—Mark Paschall
(74) *Attorney, Agent, or Firm*—Harness, Dickey & Pierce, P.L.C.

(57) ABSTRACT

Devices and methods are provided that control gas flow to a plasma arc torch local to a torch handle. Generally, a plasma arc torch is provided that comprises a gas control device operable with a torch lead and a torch head, and an activation member operable with the gas control device. Accordingly, the activation member activates the gas control device such that gas flow is supplied from the torch lead to the torch head, and the activation member deactivates the gas control device such that the gas flow is terminated. Further, the activation member may comprise a trigger system, a button, or a safety member, among others. Moreover, the gas control device may comprise a gas control valve or a switch that activates a gas control device disposed within a power supply, among others.

52 Claims, 6 Drawing Sheets

TORCH HANDLE GAS CONTROL

FIELD OF THE INVENTION

The present invention relates generally to plasma arc torches and more particularly to devices and methods for controlling the flow of a working gas to a plasma arc torch.

BACKGROUND OF THE INVENTION

Plasma arc torches are commonly used for cutting, marking, gouging, and welding metal workpieces by directing a high energy plasma stream consisting of ionized gas particles toward a workpiece. The plasma arc torch is typically connected to a power supply that provides both gas and electric power for operation of the plasma arc torch and is operable through a trigger disposed within a torch handle for activation of the gas and the electric power. With plasma arc torches of the known art, the trigger operates both the gas and the electric power such that neither the gas nor the electric power are controlled separately local to the torch handle. Some known art plasma arc torches provide separate gas controls, however, the controls are disposed within the power supply or at a location remote from the operator.

Activation of gas flow only, i.e. no electric power, is often advantageous in certain applications such as for cooling torch parts or the workpiece. However, many plasma arc devices do not provide for a gas only mode of operation, and those that do provide for such a mode require the operator to initiate and terminate the gas flow at the power supply, or at another remote location, not local to the plasma arc torch where operations are being performed. As a result, operation of a gas only mode is relatively time consuming and cumbersome in plasma arc torch systems of the known art.

Additionally, with plasma arc torches of the known art, a few seconds typically elapse from the time an operator engages a trigger to when a plasma stream is generated, which is a function of the amount of time required for the gas to travel from the power supply, through the torch lead, and to the torch head. Accordingly, with longer torch leads, the restart times are correspondingly longer, which results in further delays that reduce work efficiency and that can become frustrating to an operator if the torch is shut off and re-ignited on a regular basis. In one known system, a gas control valve is provided that dissipates gas in a plasma arc chamber after a plasma arc has been extinguished. However, the gas must still travel the length of a torch lead and rise gradually in accordance with the teachings of the known system.

Accordingly, a need remains in the art for a device and method that more efficiently controls the flow of gas to a plasma arc torch. A further need exists for such a device and associated method that reduces restart times, that is relatively simple to operate, and that does not require significant manual dexterity of the operator.

SUMMARY OF THE INVENTION

In one preferred form, the present invention provides a plasma arc torch that comprises a torch handle, a torch head disposed within the torch handle, a torch lead operable with the torch head, a gas control device disposed within the torch handle and operable with the torch lead and the torch head, and an activation member operable with the gas control device. Accordingly, the activation member activates the gas control device such that gas flow is supplied from the torch lead to the torch head, and the activation member deactivates the gas control device such that the gas flow is terminated local to the torch handle. Several forms of the activation member are provided, which may comprise a trigger system, a button, or a safety member, among others. Similarly, several forms of the gas control device are provided, which may comprise a gas control valve or a switch that activates a separate gas control device disposed within a power supply, among others. In another form, a gas control device is provided local to the torch handle so that gas at operating pressure is available adjacent the torch head such that restart times are reduced.

Additionally, methods of operating the plasma arc torch to provide a supply of gas local to the torch handle are provided by the present invention. The methods generally comprise operating the gas control device disposed within a handle of a plasma arc torch through an activation member as previously set forth to activate the supply of gas to the plasma arc torch and further to terminate, or deactivate, the supply of gas.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
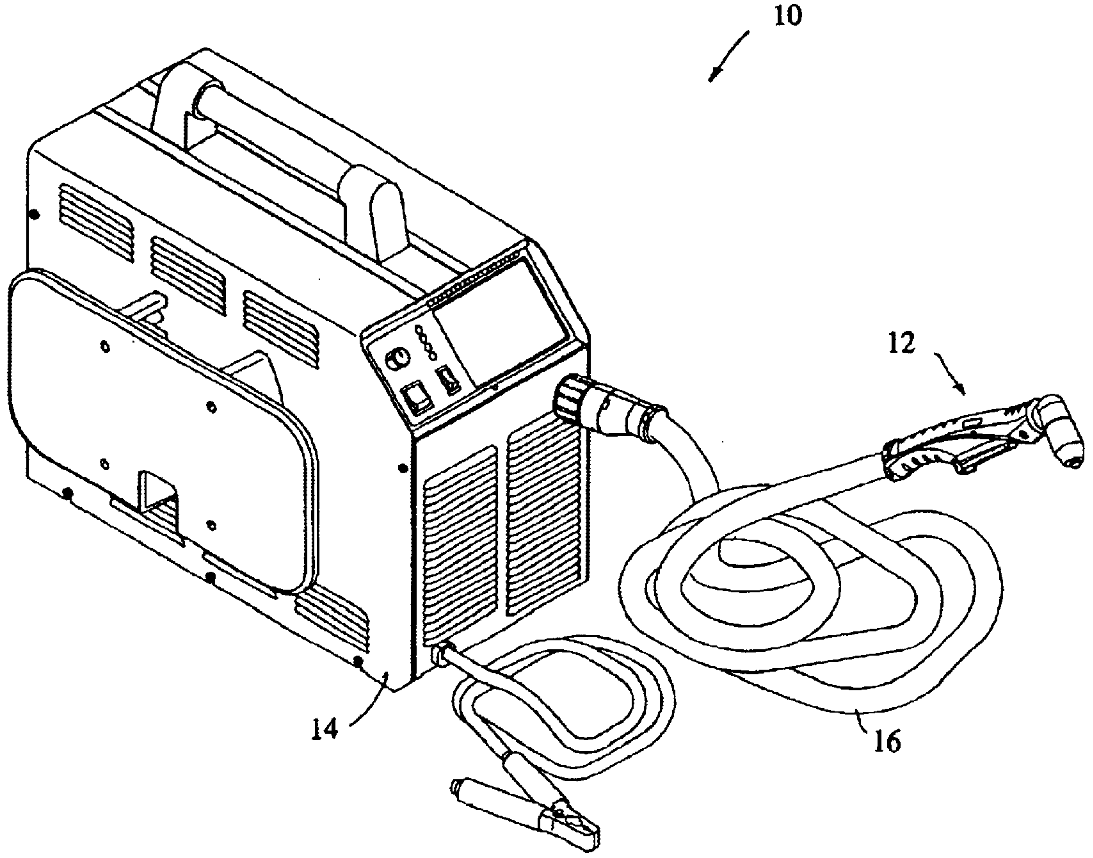
FIG. 1 is a perspective view of a manually operated plasma arc apparatus constructed in accordance with the principles of the present invention.

Referring to the drawings, a torch handle gas control according to the present invention is generally operable with a manually operated plasma arc apparatus as indicated by reference numeral 10 in FIG. 1. Typically, the manually operated plasma arc apparatus 10 comprises a plasma arc torch 12 connected to a power supply 14 through a torch lead 16, which may be available in a variety of lengths according to a specific application. Further, the power supply 14 provides both gas and electric power, which flow through the torch lead 16, for operation of the plasma arc torch 12 as described in greater detail below.

As used herein, a plasma arc apparatus, whether operated manually or automated, should be construed by those skilled in the art to be an apparatus that generates or uses plasma for cutting, welding, spraying, gouging, or marking operations, among others. Accordingly, the specific reference to plasma arc cutting torches, plasma arc torches, or manually operated plasma arc torches herein should not be construed as limiting the scope of the present invention. Furthermore, the specific reference to providing gas to a plasma arc torch should not be construed as limiting the scope of the present invention, such that other fluids, e.g. liquids, may also be provided to the plasma arc torch in accordance with the teachings of the present invention.

Figure 2:
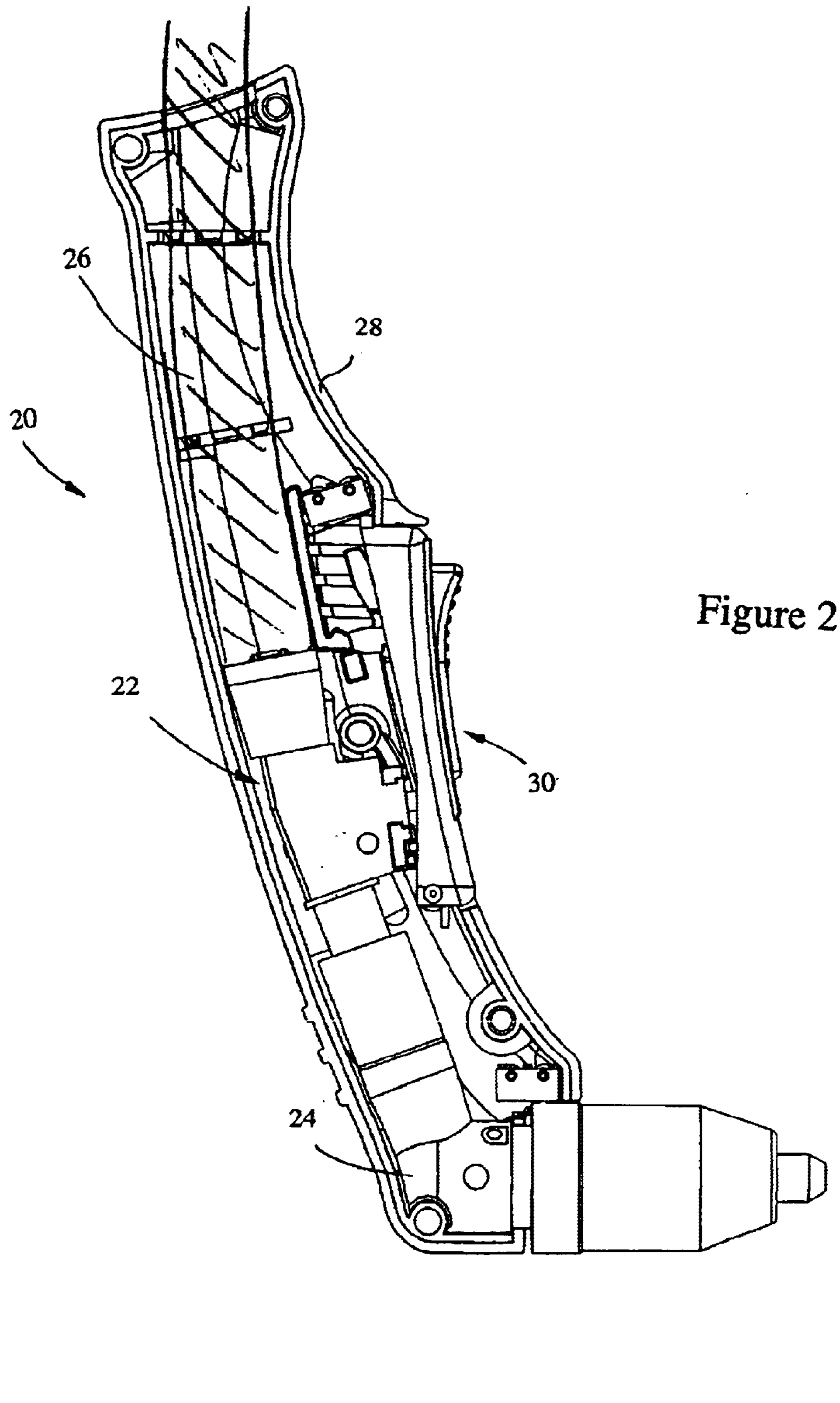
FIG. 2 is a side view of a plasma arc torch comprising a gas control device with an activation member, with one half of the handle removed to show the details of construction, in accordance with the principles of the present invention.

Referring to FIG. 2, a plasma arc torch according to the present invention is illustrated and generally indicated by reference numeral 20. As shown, the plasma arc torch 20 comprises a gas control device 22 that is operable with a torch head 24 and a torch lead 26 within a torch handle 28. The gas control device 22 is illustrated as being disposed within the torch handle 28, however, the term "disposed within" should be construed as meaning located proximate the torch handle 28 such that an operator can operate the gas control device 22 without moving to a remote location. Furthermore, the torch lead 26 is operable with the torch head 24 as shown, wherein a supply of gas and electric power is provided from the torch lead 26 to the torch head 24 for operation of the plasma arc torch 20.

Generally, the gas control device 22 operates to activate or deactivate the supply of gas from the power supply (not shown) as required during use by an operator. As further shown, the plasma arc torch 20 also comprises an activation member 30, (also referred to as a control 30),which activates the gas control device 22 to supply the flow of gas and further deactivates the gas control device 22 to terminate the flow of gas to the torch head 24. As described in greater detail below, the gas control device may comprise a gas control valve, or a switch local within the torch handle 28 that activates another gas control device disposed within the power supply, among others. Additionally, the activation member may comprise a trigger system, a button, a safety member, or a pneumatic source, each of which is described in detail below. Accordingly, a plasma arc torch with gas control local to the torch handle 28 is provided in accordance with the principles of the present invention, and the specific embodiments illustrated and described herein for the gas control devices and the activation members should not be construed as limiting the scope of the present invention. Rather, other gas control devices and activation members known in the art may be employed local to the torch handle 28 while remaining within the scope of the present invention.

Figure 3:
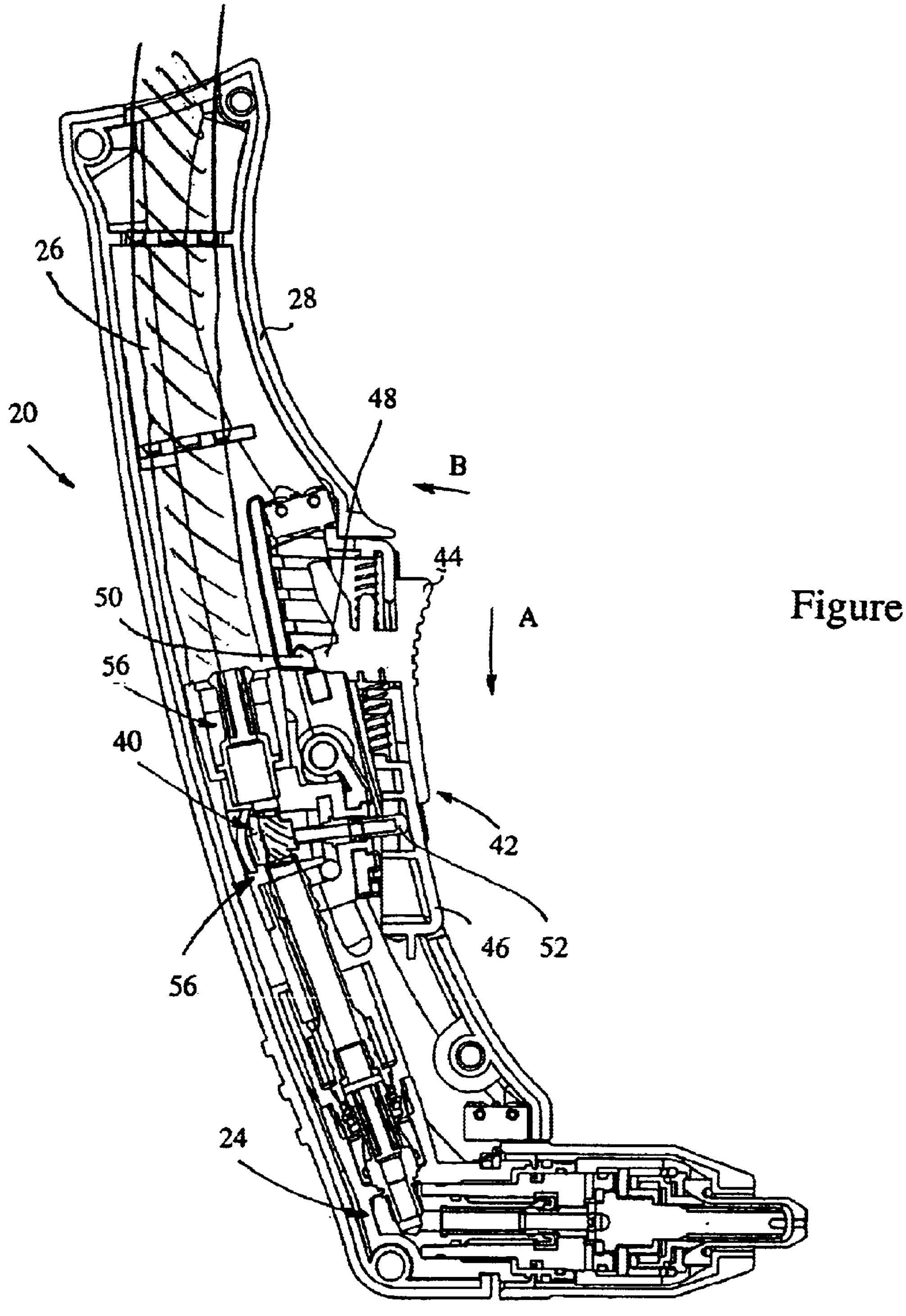
FIG. 3 is a cross-sectional view of a plasma arc torch comprising a gas control valve with a trigger system and constructed in accordance with the principles of the present invention.

Referring now to FIG. 3, the preferred form of the present invention comprises a gas control valve 40 as the gas control device and a trigger system 42 as the activation member. Operation of the trigger system 42 is further described in copending application titled "Plasma Arc Torch Trigger System," filed on Feb. 26, 2002, which is commonly assigned with the present application and the contents of which are incorporated herein by reference. As shown, the trigger system 42 comprises a selector 44 disposed within a housing 46, wherein the selector 44 is operable to different operating positions, one of which comprises a first operating position that operates the plasma arc torch 20 is a first operating mode to deliver gas only to the plasma arc torch 20. To operate the plasma arc torch 20 in the first operating mode, the selector 44 is moved forward in the direction of arrow A so that a post 48 clears a stop 50, and the housing 46 may be pivoted upward in the direction of arrow B. As the housing 46 is pivoted upward, the housing 46 engages a plunger 52, which activates the gas control valve 40 to an "on" position, which allows a supply of gas to flow from the torch lead 26 through the gas control valve 40 and to the torch head 24. As the housing 46 is released, the plunger 52 moves downward, thereby deactivating the gas control valve 40 and terminating gas flow to the torch head 20. Accordingly, gas control local to the torch handle 28 is provided in accordance with the teachings of the present invention.

Additionally, the gas control device 22, whether a gas control valve 40 or other, maintains operational pressure adjacent the torch head 24, which reduces restart time of the plasma arc torch 20. Accordingly, the plasma arc 20 is operable in another embodiment with the gas control device 22 and a conventional trigger, without an activation member 30, such that the plasma arc torch 20 provides reduced restart times over torches without an independent gas control local to the torch handle 28.

Further, the gas control device 22 is preferably connected to the torch head 24 and the torch lead 26 using a quick disconnect 56 as shown and described in copending application titled "Modular Plasma Arc Torch," filed on Feb. 26, 2002, which is commonly assigned with the present application and the contents of which are incorporated herein by reference. Accordingly, the gas control 22 may be quickly assembled to and disassembled from the torch components such as the torch head 24 and the torch lead 26 within the plasma arc torch 20 as necessary.

Figure 4:
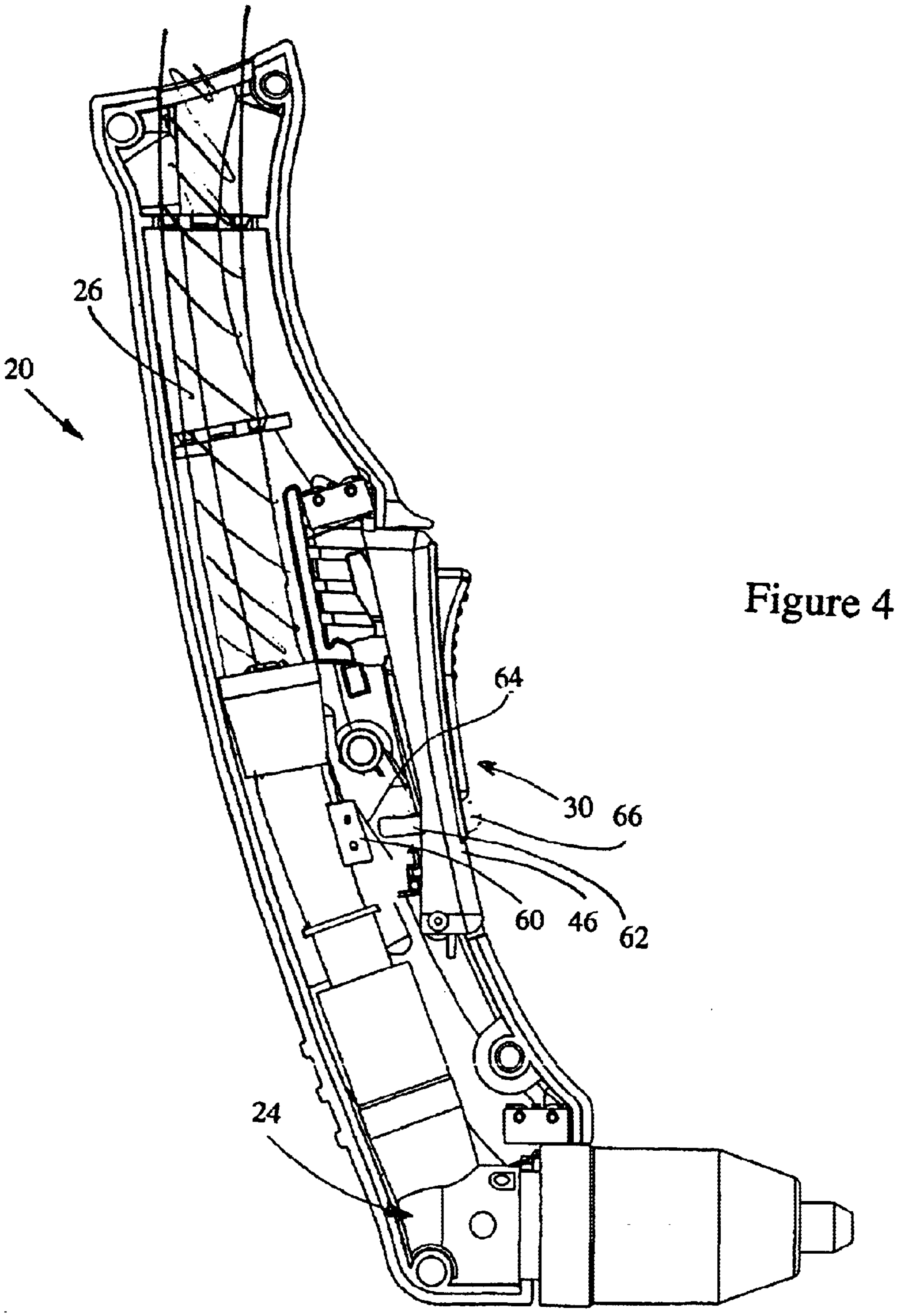
FIG. 4 is a side view of a plasma arc torch comprising a switch that activates a gas control device, with one half of the handle removed to show the details of construction, in accordance with the principles of the present invention.

As shown in FIG. 4, the gas control device may alternately comprise a switch 60 that is activated by the activation member 30 (illustrated as the trigger system 42). With the trigger system 42 as the activation member 30, the housing 46 is pivoted upward and an engagement member 62 depresses an arm 64 of the switch 60, thereby activating the switch 60. The switch 60 then activates another gas control device (not shown), for example a solenoid, which can be located within the power supply, and the supply of gas is provided through the torch lead 26 and the torch head 24. Alternately, the activation member 30 may be a button 66 (shown dashed) that engages the engagement member 62, or which directly engages the arm 64 of the switch 60. Preferably, the button 66 is resiliently biased such that the switch 60 is off when the button 66 is not depressed. Further, although the button 66 is shown positioned within the trigger system 42, the button may also be positioned in other locations proximate the torch handle 28 and remain within the scope of the present invention. Moreover, although gas pressure is not built up local to the torch head 24 as with previous embodiments, the switch 60 maintains independent gas control local to the torch handle 28.

Figure 5:
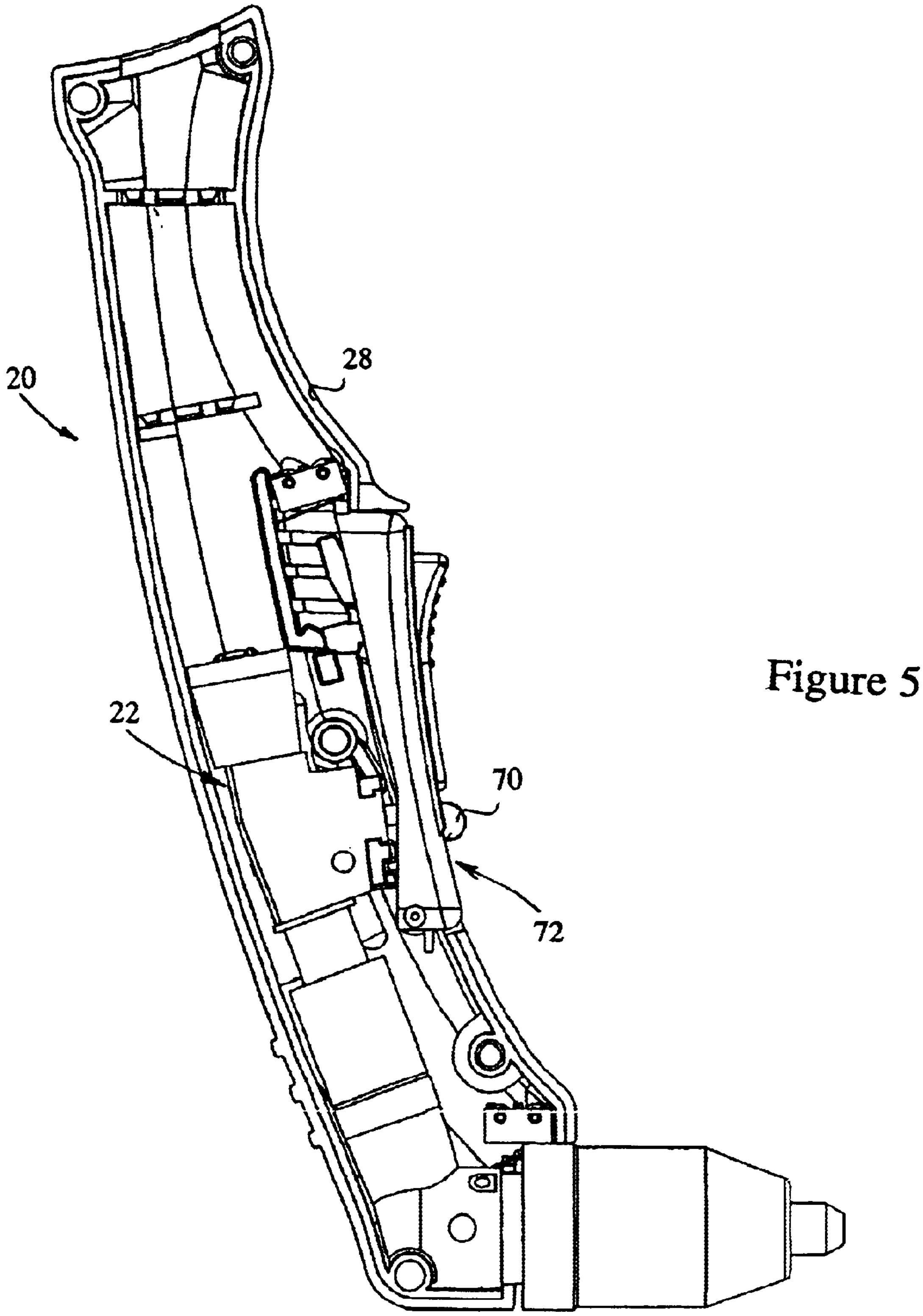
FIG. 5 is a side view of a plasma arc torch comprising a gas control device that is activated by a button, with one half of the handle removed to show the details of construction, in accordance with the principles of the present invention.

Referring now to FIG. 5, the plasma arc torch 20 is illustrated with a button 70 that activates the gas control device 22. As shown, the button 70 is disposed within a trigger 72, however, the button 70 may alternately be disposed in other locations proximate, or local, the torch handle 28 and remain within the scope of the present invention. To activate the gas control device 22, which may be a gas control valve or a switch as previously described, among others, the button 70 is depressed, which causes the button 70 to activate the gas control device 22 either directly or through a separate engagement member. Accordingly, the button 70 is depressed to activate the supply of gas. Conversely, to terminate the supply of gas, the button 70 is released. Furthermore, the button 70 is preferably resiliently biased such that the gas control device 22 is off when the button 66 is not depressed.

Figure 6:
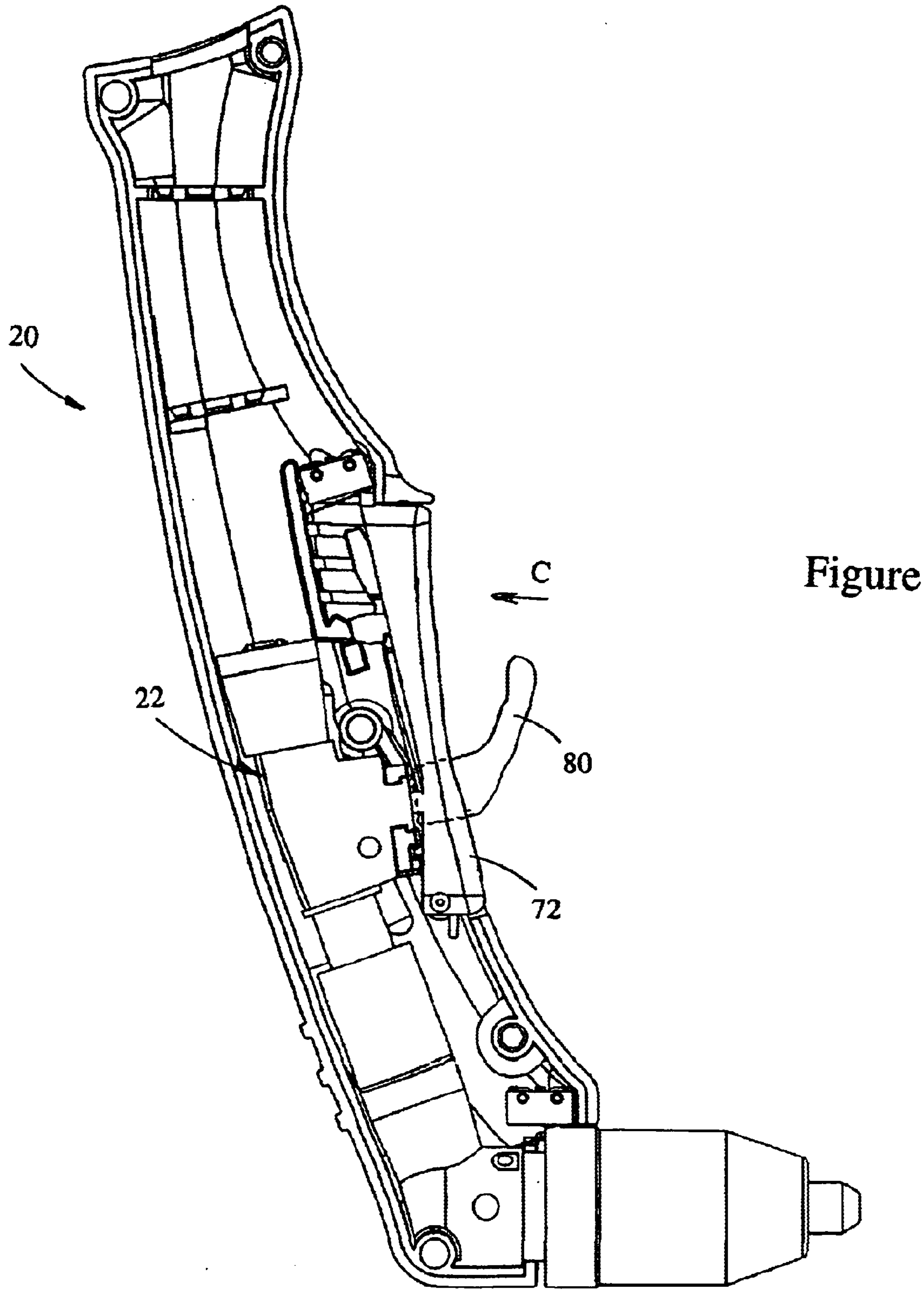
FIG. 6 is a side view of a plasma arc torch comprising a gas control device that is activated by a safety member, with one half of the handle removed to show the details of construction, in accordance with the principles of the present invention.

With reference to FIG. 6, the activation member may alternately comprise a safety member 80, such as that disclosed in U.S. Pat. No. 5,597,497, which in incorporated herein by reference. In operation, the safety member 80 is moved upward in the direction of arrow C, which causes the safety member 80, or a separate engagement member, to engage the gas control device 22, (which may be the valve or switch as previously described, among others), which activates the supply of gas. To terminate the supply of gas, the safety member 80 is released. Accordingly, gas supply local to the torch handle 28 is controlled with the safety member 80 as shown.

Accordingly, gas control local to a torch handle of a plasma arc torch is provided by the teachings of the present invention. The gas control is accomplished through a gas control device, which may be a gas control valve or a switch that activates a separate gas control device disposed within a power supply, among others. Additionally, the gas control device is activated by an activation member, which may comprise a trigger system, a button, a safety member, or a pneumatic source, among others.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A plasma arc torch comprising:

a torch handle;

a torch head disposed within the torch handle;

a torch lead operable with the torch head;

a gas control device disposed within the torch handle and operable with the torch lead and the torch head; and an activation member operable with the gas control device, wherein the activation member activates the gas control device such that gas flow is supplied from the torch lead to the torch head, and the activation member deactivates the gas control device such that the gas flow is terminated.

2. The plasma arc torch according to claim 1, wherein the gas control device is a gas control valve.

3. The plasma arc torch according to claim 2, wherein the activation member is a housing within a trigger system.

4. The plasma arc torch according to claim 3, wherein the housing is resiliently biased such that the gas control valve is in an off position.

5. The plasma arc torch according to claim 2, wherein the activation member is a selector within a trigger system.

6. The plasma arc torch according to claim 1, wherein the activation member is a button proximate the torch handle.

7. The plasma arc torch according to claim 1, wherein the activation member is a safety member.

8. The plasma arc torch according to claim 1, wherein the gas control device is a switch that activates a gas control device disposed within a power supply.

9. A plasma arc torch comprising:

a torch handle;

a torch head disposed within the torch handle;

a torch lead operable with the torch head;

a gas control device disposed within the torch handle and operable with the torch lead and the torch head; and a trigger system operable with the gas control device, wherein the trigger system activates the gas control device such that gas flow is supplied from the torch lead to the torch head, and the trigger system deactivates the gas control device such that the gas flow is terminated.

10. The plasma arc torch according to claim 9, wherein the gas control device is a gas control valve.

11. The plasma arc torch according to claim 10, wherein the activation member is a housing within the trigger system.

12. The plasma arc torch according to claim 11, wherein the housing is resiliently biased such that the gas control valve is in an off position.

13. The plasma arc torch according to claim 10, wherein the activation member is a selector within the trigger system.

14. The plasma arc torch according to claim 9, wherein the gas control device is a switch that activates a gas control device disposed within a power supply.

15. A plasma arc torch comprising:

a torch handle;

a torch head disposed within the torch handle;

a torch lead operable with the torch head;

a gas control device disposed within the torch handle and operable with the torch lead and the torch head; and a button disposed proximate the torch handle and operable with the gas control device, wherein the button activates the gas control device such that gas flow is supplied from the torch lead to the torch head, and the button deactivates the gas control device such that the gas flow is terminated.

16. The plasma arc torch according to claim 15, wherein the gas control device is a gas control valve.

17. The plasma arc torch according to claim 15, wherein the gas control device is a switch that activates a gas control device disposed within a power supply.

18. The plasma arc torch according to claim 15, wherein the button is resiliently biased such that the gas control device is in an off position.

19. A plasma arc torch comprising:

a torch handle;

a torch head disposed within the torch handle;

a torch lead operable with the torch head; and a gas control device disposed within the torch handle and operable with the torch lead and the torch head, wherein the gas control device allow gas pressure to build up local to the torch head, thereby reducing restart times.

20. The plasma arc torch according to claim 19, wherein the gas control device is a gas control valve.

21. A plasma arc torch comprising:

a torch handle;

a torch head disposed within the torch handle;

a torch lead operable with the torch head;

a gas control valve disposed within the torch handle and operable with the torch lead and the torch head; and an activation member operable with the gas control valve, wherein the activation member activates the gas control valve such that gas flow is supplied from the torch lead to the torch head, and the activation member deactivates the gas control valve such that the gas flow is terminated.

22. The plasma arc torch according to claim 21, wherein the activation member is a housing within a trigger system.

23. The plasma arc torch according to claim 22, wherein the housing is resiliently biased such that the gas control valve is in an off position.

24. The plasma arc torch according to claim 21, wherein the activation member is a selector within a trigger system.

25. The plasma arc torch according to claim 21, wherein the activation member is a button disposed proximate the torch handle.

26. The plasma arc torch according to claim 21, wherein the activation member is a safety member.

27. A plasma arc torch comprising:

a torch handle;

a torch head disposed within the torch handle;

a torch lead operable with the torch head;

a gas control valve disposed within the torch handle and operable with the torch lead and the torch head; and a trigger system operable with the gas control valve, wherein the trigger system activates the gas control valve such that gas flow is supplied from the torch lead to the torch head, and the trigger system deactivates the gas control valve such that the gas flow is terminated.

28. The plasma arc torch according to claim 27, wherein the trigger system further comprises a housing that activates the gas control valve and is resiliently biased such that the gas control valve is in an off position.

29. The plasma arc torch according to claim 27, wherein the trigger system further comprises a selector that activates the gas control valve.

30. A plasma arc torch comprising:

a torch handle;

a torch head disposed within the torch handle;

a torch lead operable with the torch head;

a gas control valve disposed within the torch handle and operable with the torch lead and the torch head; and a button disposed proximate the torch handle and operable with the gas control valve, wherein the button activates the gas control valve such that gas flow is supplied from the torch lead to the torch head, and the button deactivates the gas control valve such that the gas flow is terminated.

31. A plasma arc torch comprising:

a torch handle;

a torch head disposed within the torch handle;

a torch lead operable with the torch head;

a switch disposed within the torch handle and operable with a gas control device disposed within a power supply; and an activation member operable with the switch, wherein the activation member activates the switch such that the gas control device provides gas flow to the torch lead and the torch head, and the activation member deactivates the switch such that the gas flow is terminated.

32. The plasma arc torch according to claim 31, wherein the activation member is a housing within a trigger system.

33. The plasma arc torch according to claim 31, wherein the activation member is a selector within a trigger system.

34. The plasma arc torch according to claim 31, wherein the activation member is a button disposed proximate the torch handle.

35. The plasma arc torch according to claim 31, wherein the activation member is a safety member.

36. A plasma arc torch comprising:

a torch handle;

a torch head disposed within the torch handle;

a torch lead operable with the torch head;

a switch disposed within the torch handle and operable with a gas control device disposed within a power supply; and a trigger system operable with the switch, wherein the trigger system activates the switch such that the gas control device provides gas flow to the torch lead and the torch head, and the trigger system deactivates the switch such that the gas flow is terminated.

37. The plasma arc torch according to claim 36, wherein the trigger system further comprises a housing that activates the switch.

38. The plasma arc torch according to claim 36, wherein the trigger system further comprises a selector that activates the switch.

39. A plasma arc torch comprising:

a torch handle;

a torch head disposed within the torch handle;

a torch lead operable with the torch head;

a switch disposed within the torch handle and operable with a gas control device disposed within a power supply; and a button disposed proximate the torch handle and operable with the switch, wherein the button activates the switch such that the gas control device provides gas flow to the torch lead and the torch head, and the button deactivates the switch such that the gas flow is terminated.

40. A plasma arc torch comprising:

a torch handle;

a torch head disposed within the torch handle;

a torch lead operable with the torch head;

a gas control valve disposed within the torch handle and operable with the torch lead and the torch head; and a trigger system operable with the gas control valve, the trigger system comprising a selector disposed within a housing, wherein the selector is operable to a first operating position such that the housing activates the gas control valve, and the selector is operable to a neutral position such that the housing deactivates the gas control valve.

41. A plasma arc torch comprising:

a torch handle;

a torch head disposed in the torch handle and adapted for connection to a source of gas and electric power; and a control on the handle for selectively providing gas to the torch head independently of the electric power.

42. The plasma arc torch according to claim 41 further comprising a gas control valve disposed in the handle operable for controlling flow of the gas from the source to the torch head, and wherein the control operates the gas control valve.

43. The plasma arc torch according to claim 41, wherein the control comprises a power switch adapted to be connected to a solenoid valve for controlling flow of the gas from the source.

44. A plasma arc torch comprising a torch head adapted to be connected to a source of electric power and gas, the torch having a control for selectively providing gas to the torch head independently of electric power.

45. A method of operating a plasma arc torch, the method comprising the steps of:

providing a source of gas;

providing an activation member operable with a gas control device disposed within a handle of the plasma arc torch; and operating the activation member such that the gas control device is activated, thereby providing the gas to the plasma arc torch.

46. The method according to claim 45 further comprising the step of:

operating the activation member such that the gas control device is deactivated, thereby terminating the gas to the plasma arc torch.

47. A method of operating a plasma arc torch, the method comprising the steps of:

providing a source of gas;

providing a trigger system operable with a gas control valve disposed within a handle of the plasma arc torch; and operating the trigger system such that the gas control valve is activated, thereby providing the gas to the plasma arc torch.

48. The method according to claim 47 further comprising the step of:

operating the trigger system such that the gas control valve is deactivated, thereby terminating the gas to the plasma arc torch.

49. A method of operating a plasma arc torch, the method comprising the steps of:

providing a source of gas;

providing a button operable with a gas control valve disposed within a torch handle of the plasma arc torch; and operating the button such that the gas control valve is activated, thereby providing the gas to the plasma arc torch.

50. The method according to claim 49 further comprising the step of:

operating the button such that the gas control valve is deactivated, thereby terminating the gas to the plasma arc torch.

51. A method of operating a plasma arc torch, the method comprising the steps of:

providing a source of gas;

providing a trigger system operable with a switch disposed within a torch handle of the plasma arc torch, the switch operable with a gas control device within a power supply; and operating the trigger system such that the switch is activated, thereby activating the gas control device and providing the gas to the plasma arc torch.

52. The method according to claim 51 further comprising the step of:

operating the trigger system such that the switch is deactivated, thereby terminating the gas to the plasma arc torch.

* * * * *